US010369592B2

(12) United States Patent
Wilson et al.

(10) Patent No.: US 10,369,592 B2
(45) Date of Patent: *Aug. 6, 2019

(54) MOBLE UVA CURING SYSTEM FOR COLLISION AND COSMETIC REPAIR OF AUTOMOBILES

(71) Applicant: SPDI, Inc., Delray Beach, FL (US)

(72) Inventors: John Wilson, Boynton Beach, FL (US); Robert Schenk, Lakeworth, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/889,267

(22) Filed: Feb. 6, 2018

(65) Prior Publication Data
US 2018/0221913 A1    Aug. 9, 2018

Related U.S. Application Data

(63) Continuation of application No. 14/664,822, filed on Mar. 21, 2015, now Pat. No. 9,919,338, which is a continuation of application No. 13/973,841, filed on Aug. 22, 2013, now Pat. No. 9,035,271.

(60) Provisional application No. 61/771,168, filed on Mar. 1, 2013.

(51) Int. Cl.
| B05C 21/00 | (2006.01) |
| B05D 3/06 | (2006.01) |
| F26B 3/28 | (2006.01) |
| B41F 23/00 | (2006.01) |
| B05B 15/00 | (2018.01) |
| B29C 73/34 | (2006.01) |
| B29C 35/08 | (2006.01) |

(52) U.S. Cl.
CPC ............. B05C 21/00 (2013.01); B05B 15/00 (2013.01); B05D 3/067 (2013.01); B41F 23/00 (2013.01); F26B 3/28 (2013.01); *B29C 73/34* (2013.01); *B29C 2035/0827* (2013.01); *F26B 2210/12* (2013.01)

(58) Field of Classification Search
CPC ......... B05C 21/00; B05B 15/00; B05D 3/067; B41F 23/00; F26B 3/28; F26B 2210/12; B29C 73/34; B29C 2035/0827
USPC .................... 250/492.1, 493.1, 504 R, 504 H
See application file for complete search history.

(56) References Cited

U.S. PATENT DOCUMENTS

| 9,035,271 B2* | 5/2015 | Wilson | B05D 3/067 |
| | | | 250/504 H |
| 9,324,467 B2* | 4/2016 | Wilson | B05C 5/001 |
| 9,919,338 B2* | 3/2018 | Wilson | B05D 3/067 |

* cited by examiner

*Primary Examiner* — Nicole M Ippolito
(74) *Attorney, Agent, or Firm* — Howard M. Gitten; Lewis Brisbois Bisgaard & Smith, LLP

(57) ABSTRACT

The present invention is directed to a mobile radiation system that comprises a mobile radiation device coupled to a control unit; a radiation blocker having an adaptor opening for receiving said mobile radiation device when said mobile radiation device is in a seated position on said radiation blocker; and a mobile carrier comprising a first compartment for housing said radiation blocker, a second compartment for housing said control unit, and one or more carrier motion devices. The adaptor opening can dimensionally fit the mobile radiation device to block radiations from the mobile radiation device when said mobile radiation device is in the seated position. The mobile radiation device can produce radiation having peak radiation wavelength in a range of from 250 nm to 450 nm and can have a peak irradiation power in a range of from 0.5 W/cm² to 10 W/cm².

14 Claims, 6 Drawing Sheets

MOBILE UVA CURING SYSTEM FOR COLLISION AND COSMETIC REPAIR OF AUTOMOBILES

FIELD OF DISCLOSURE

The present disclosure is directed to a mobile radiation system. This disclosure is further directed to a mobile radiation system for curing a radiation curable coating composition to form a cured coating layer.

BACKGROUND OF DISCLOSURE

The use of radiation curable coatings becoming more common in coating industry. Such use requires a combination of radiation curable coating compositions and a radiation source. Typically, an ultraviolet (UV) source such as a UV lamp can be used for curing a UV curable coating composition applied over a substrate to form a cured coating layer. However, the radiation such as the UV radiation from the UV lamp can be harmful for operators during the use.

Therefore, needs exist for an improved radiation system.

STATEMENT OF DISCLOSURE

This invention is directed to a mobile radiation system comprising:
- (a1) a mobile radiation device (1) coupled to a control unit (2) via one or more coupling devices (3);
- (a2) a radiation blocker (4) having an adaptor opening (5) for receiving said mobile radiation device (1) when said mobile radiation device is in a seated position on said radiation blocker (4);
- (a3) a mobile carrier (10) comprising a first compartment (11) for housing said radiation blocker, a second compartment (12) for housing said control unit, and one or more carrier motion devices (13);
- wherein said adaptor opening dimensionally fits said mobile radiation device to block radiations from said mobile radiation device when said mobile radiation device is in said seated position on said radiation blocker.

This invention is further directed to a kit for a mobile radiation system, the kit comprising:
- (b1) a mobile radiation device (1);
- (b2) a control unit (2);
- (b3) one or more coupling devices (3);
- (b4) a radiation blocker (4) having an adaptor opening (5) for receiving said mobile radiation device (1) in a seated position on said radiation blocker;
- (b5) a mobile carrier (10) comprising a first compartment (11) for housing said radiation blocker (4), a second compartment (12) for housing said control unit, and one or more carrier motion devices (13);
- wherein said mobile radiation device (1) is connectable to said control unit (2) via said one or more coupling devices (3);
- said adaptor opening (5) dimensionally fits said mobile radiation device (1) to block radiations from said mobile radiation device when said mobile radiation device is received in said seated position on said radiation blocker.

DETAILED DESCRIPTION

Figure 1:
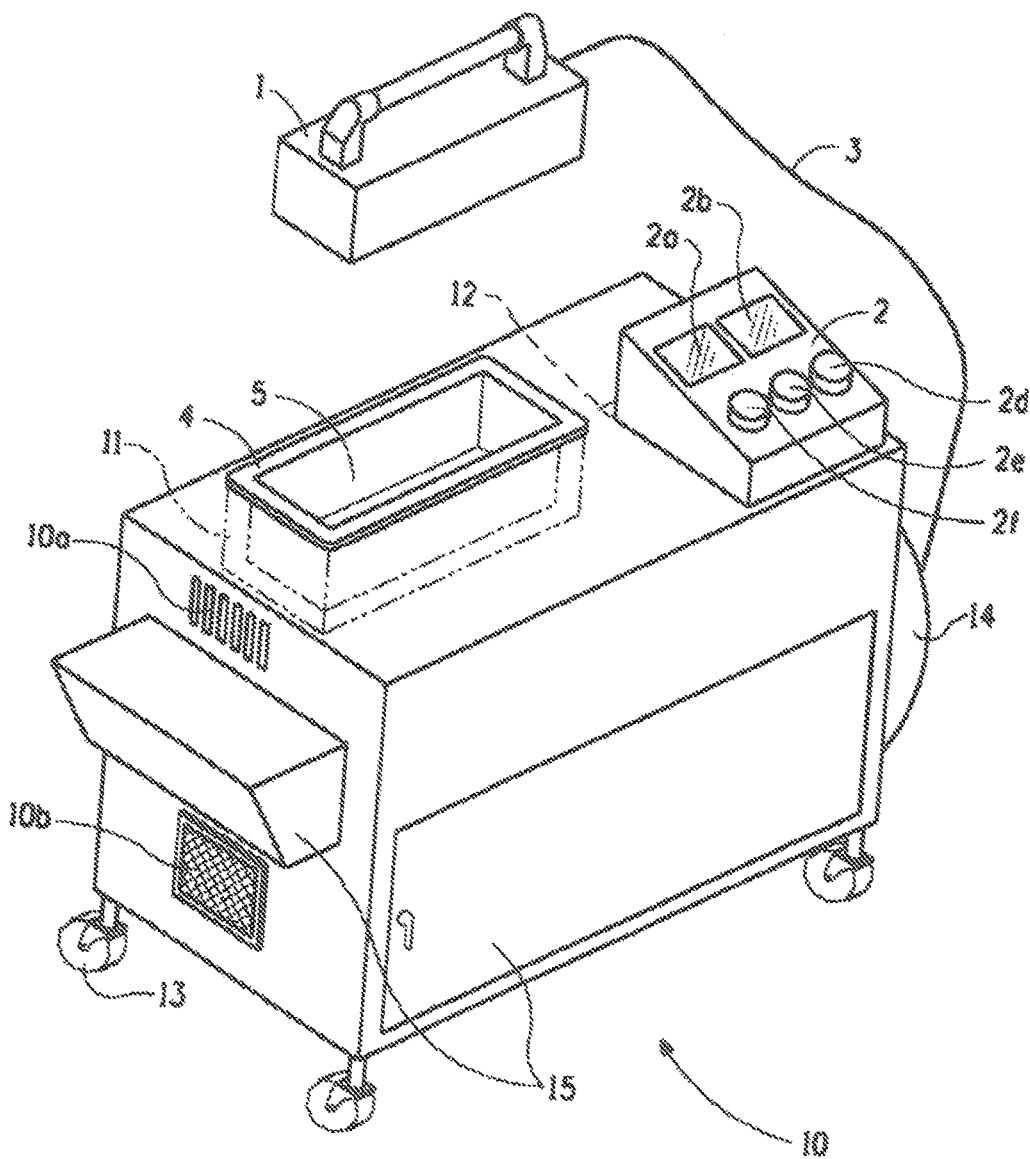
FIG. 1 shows a schematic presentation of an example of the system when the mobile radiation device is not in the seated position.

The features and advantages of the present invention will be more readily under stood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

This disclosure is directed to a mobile radiation system. The mobile radiation device can comprise:
- (a1) a mobile radiation device (1) coupled to a control unit (2) via one or more coupling devices (3);
- (a2) a radiation blocker (4) having an adaptor opening (5) for receiving said mobile radiation device (1) when said mobile radiation device is in a seated position on said radiation blocker (4);
- (a3) a mobile carrier (10) comprising a first compartment (11) for housing said radiation blocker, a second compartment (12) for housing said control unit, and one or more carrier motion devices (13);
- wherein said adaptor opening dimensionally fits said mobile radiation device to block radiations from said mobile radiation device when said mobile radiation device is in said seated position on said radiation blocker.

Figure 2:
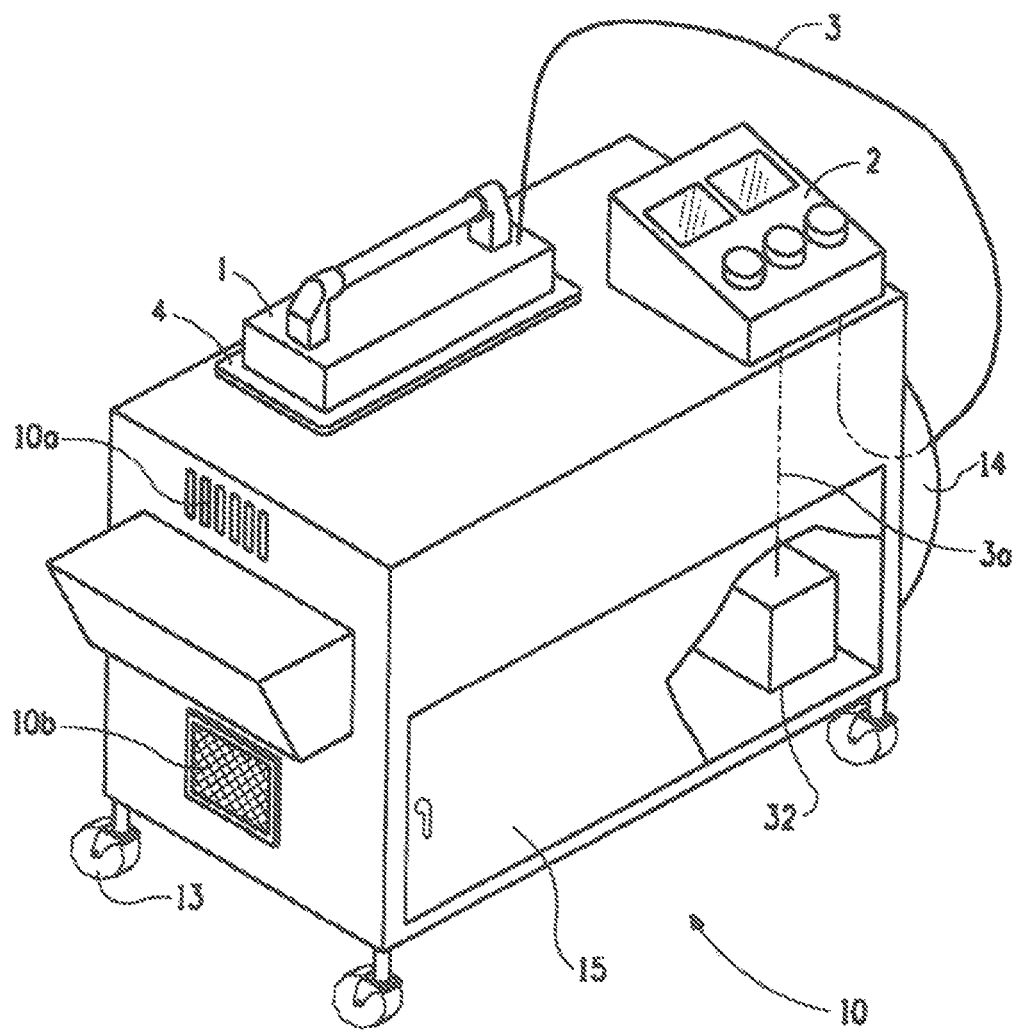
FIG. 2 shows a schematic presentation of an example of the system when the mobile radiation device is not in the seated position.

The system can have the mobile radiation device not in the seated position (FIG. 1) or with the mobile radiation device in the seated position (FIG. 2).

The mobile radiation device can comprise a UV source such as a UV light bulb (20) such as a mercury UV lamp, a UV light-emitting diode (LED), or any other UV source that can provide the desired irradiation power at the target coating. A UV power measuring device, such as a UV POWER PUCK® FLASH, available from The EIT Instrument, Sterling, Va. 20164, USA, under respective registered trademark, can be suitable to measure UV irradiation power.

The control unit (2) can be used to adjust or control the UV irradiation power, duration of power timing, or a combination thereof. The irradiation power measured at the coating to be tested, such as the target coating or the control coating, can be adjusted by adjusting power to the mobile radiation device such as the power to the UV lamp or UV LED, the distance between the mobile radiation device and the coating to be irradiated, UV reflection assembly such configurations of radiation reflector disclosed hereafter, or a combination thereof. The control unit (2) can comprise one or more display devices (2a-2b), one or more adjustment devices such as dials (2d-2f) (FIG. 1). The control unit can further comprise other control devices as determined necessary.

The mobile radiation device can be configured to produce radiations having peak radiation wavelength in a range of from 250 nm to 450 nm and has a peak irradiation power in a range of from 0.5 W/cm$^2$ to 10 W/cm$^2$. Different UV source can also produce UV irradiations at same or different one or more peak wavelengths. In one example, an Arc UV source can have a peak wavelength at about 315 nm or 365 nm. In another example, an LED UV source can have a peak wavelength at about 365 nm.

Figure 3:
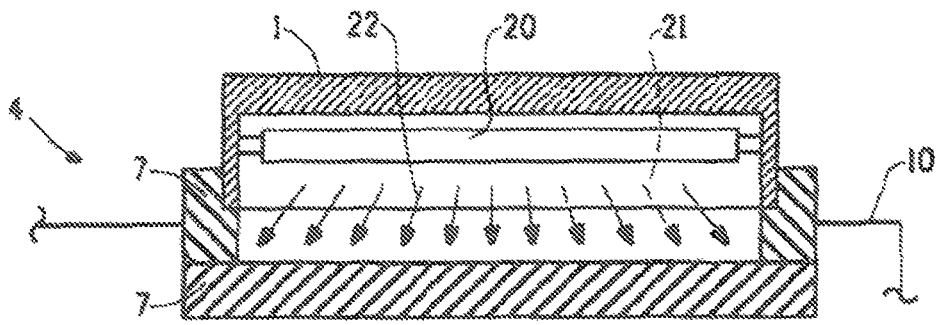
FIG. 3 shows a schematic cross-sectional presentation of an example of the system with a radiation blocker that has total radiation blocking elements on all sides.
Figure 4:
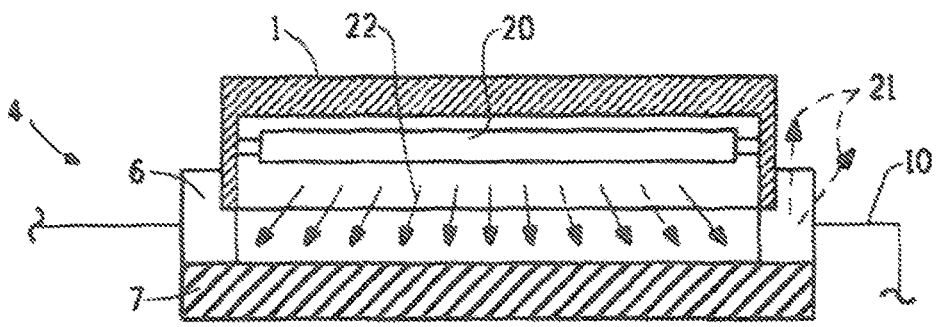
FIG. 4 shows a schematic cross-sectional presentation of an example of the system with an example of a radiation blocker that has UV blocking elements.
Figure 5:
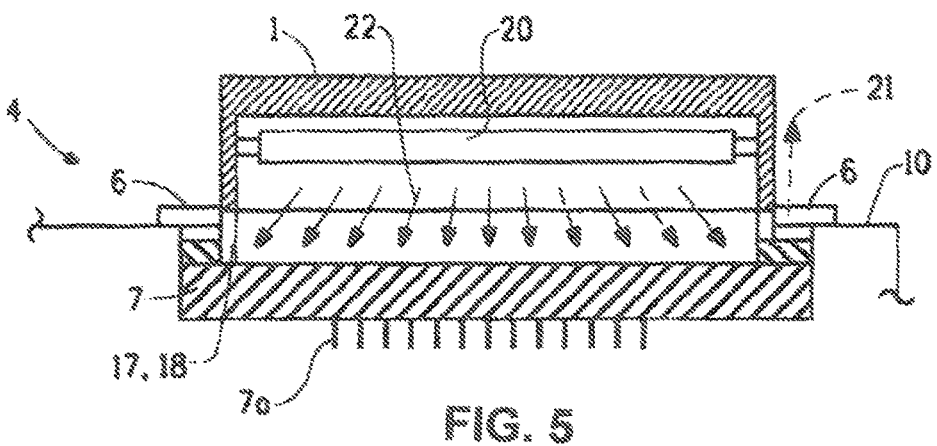
FIG. 5 shows a schematic cross-sectional presentation of another example of a radiation blocker that has UV blocking elements.

The radiation blocker can comprise one or more UV blocking elements (6) that permit visible radiations (21) to exit the radiation blocker while blocking UV radiations (22) from exiting said radiation blocker, when said mobile radiation device is in the seated position (FIGS. 3-5). The UV blocking elements can be transparent, translucent, fluorescent, or a combination thereof. Examples of radiation blocker can include UV blocking glass, UV blocking plastics or other polymers, or a combination thereof. The radiation blocker can also comprise one or more total radiation blocking elements (7) that block UV radiations and visible radiations from exiting said radiation blocker. Examples of the total radiation blocking elements can include metal sheets or blocks, ceramic sheets or blocks, or any other materials that can block UV radiations and visible radiations.

One advantage of the system disclosed herein is that the UV blocking elements (6) can permit visible radiations (21) to exit the radiation blocker so an operator can visually confirm that the UV source is actually powered when the mobile radiation device is seated on the radiation blocker without being exposed to the UV irradiation.

Figure 11:
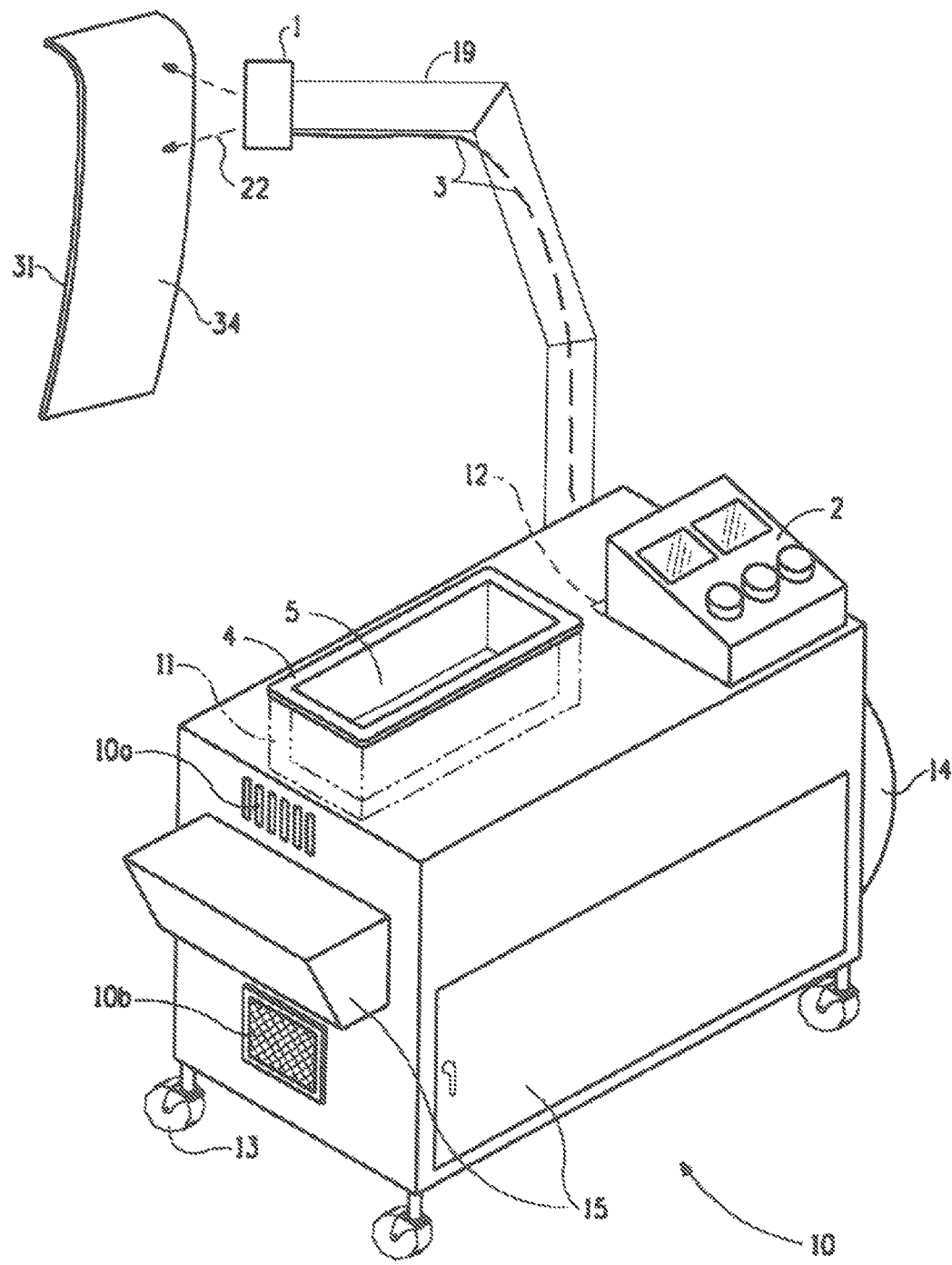

The mobile carrier can further comprise a coupler supporting device (14) for storing and supporting said one or more coupling device (3) that couples the mobile radiation device and the control unit (FIG. 1, FIG. 2 and FIG. 11).

The mobile carrier can further comprise one or more storage compartments (15) (FIG. 1, FIG. 2 and FIG. 11).

Figure 6:
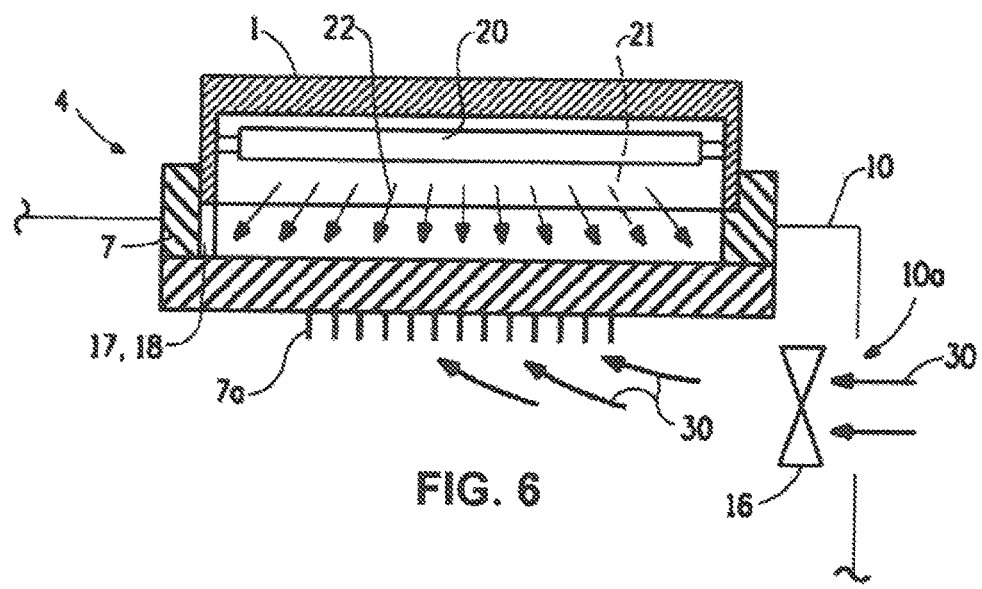
FIG. 6 shows a schematic cross-sectional presentation of an example of the system having a carrier cooling fan.
Figure 7:
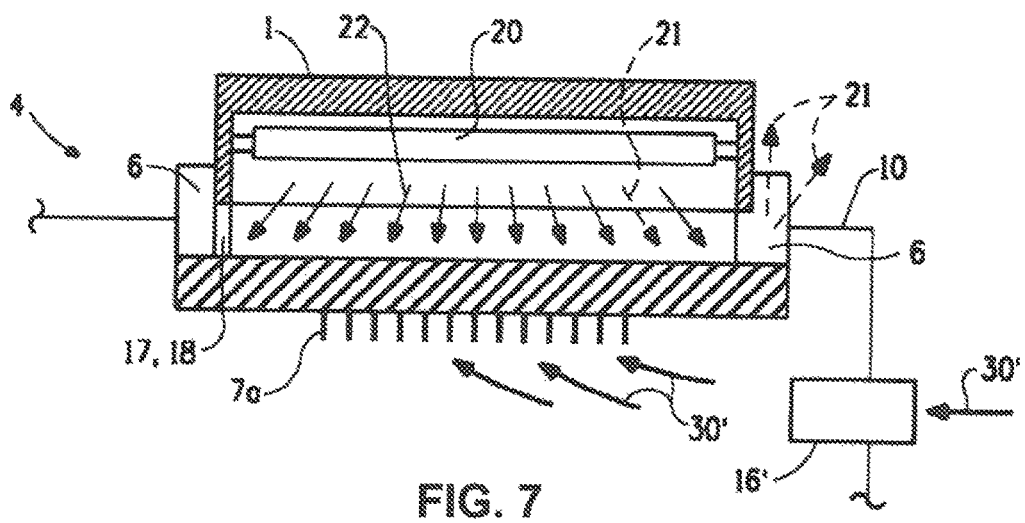
FIG. 7 shows a schematic cross-sectional presentation of an example of the system having a carrier cooling air duct.

The mobile carrier can further comprise at least a cooling device (16) for cooling said mobile radiation device in said seated position. The cooling device can comprise a carrier cooling fan (16) (FIG. 6), a carrier cooling air duct (16') (FIG. 7), or a combination thereof. The mobile carrier can further comprise one or more vents (10a-10b) (FIG. 1) to provide ventilation. In one example, ambient external air (30) can be forced by the fan (16) into the carrier to cool the radiation blocker (FIG. 7). In another example, cooled air (30') can be provided to the carrier via the carrier cooling air duct (16') (FIG. 7). In another example, the carrier can comprise a combination of the cooled air and the fan to provide the cooled air (30') into the carrier by the fan (16). The radiation blocker can have a plurality of thermal fins (7a) for disperse heat (FIG. 6 and FIG. 7). In another example, the carrier cam comprise the thermal fin and at least one vent (10a) or (10b) without the fan.

The cooling device can comprise a cooling sensing device (17) to power on the cooling device when said mobile radiation device is in the seated position. When the mobile radiation device is moved from the seated position, the cooling sensing device (17) can automatically turn off the cooling device to conserve power.

The mobile carrier can further comprise an activity sensing device (18) (FIG. 5) coupled to the mobile radiation device and the control unit to power off the mobile radiation device if the mobile radiation device is powered and remains in the seated position for a predetermined period of time. In one example, the cooling sensing device (17) and the activity sensing device (18) can be configured into one single device (FIG. 5) so the cooling device can be triggered to be turned on when the mobile radiation device is placed in the seated position and subsequently, the power can be turned off if the mobile radiation device remains in the seated position for a predetermined period of time.

Figure 8:
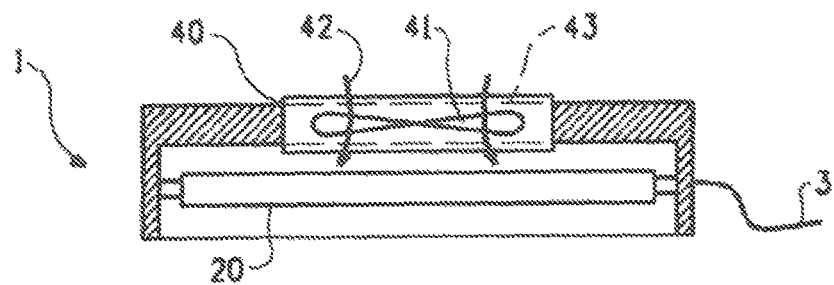
FIG. 8 shows a schematic cross-sectional presentation of an example of the system having a vent fan and a shutter system.
Figure 9:
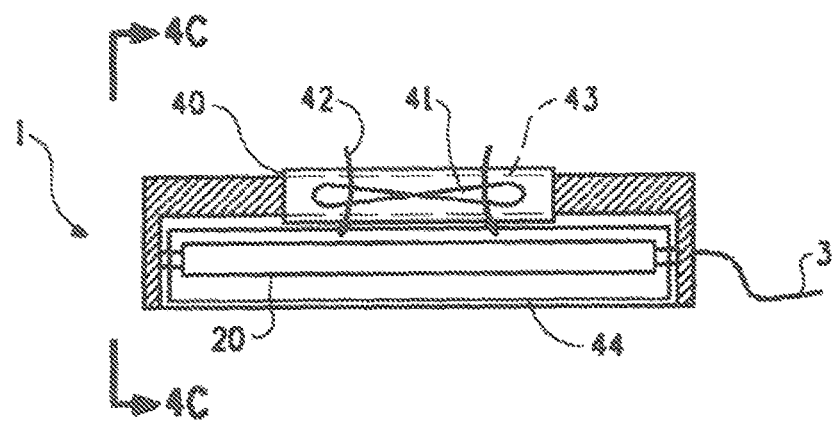
FIG. 9 shows a schematic cross-sectional presentation of an example of the system having a radiation reflector.

The mobile radiation device can comprise at least one cooling vent (40) on the radiation device (FIGS. 8-9). The mobile radiation device can further comprise at least one vent fan (41), a shutter system (43) to block the radiation of the UV source from exiting through the cooling vent (40) while allowing cooling air (42) to flow through the cooling vent, or a combination thereof.

Figure 10:
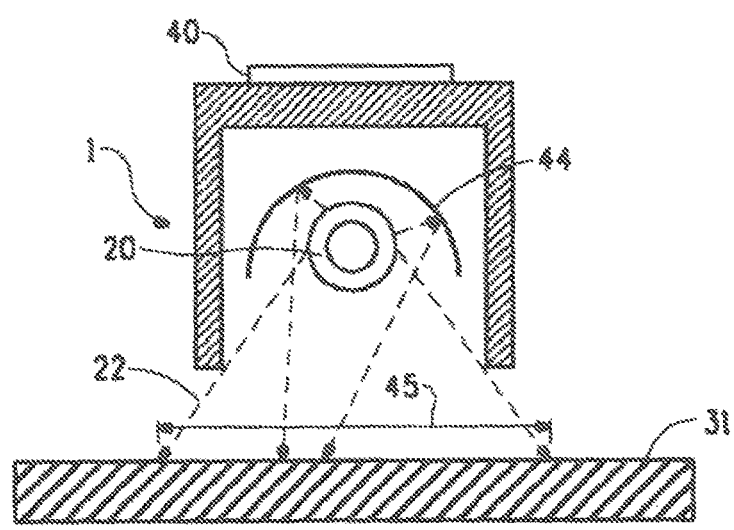
FIG. 10 shows a schematic cross-sectional presentation of an example of the system having a radiation area; and, FIG. 11 shows a schematic cross-sectional presentation of an example of the system having a radiation supporting device.

The mobile radiation device can further comprise a radiation reflector (44) (FIG. 9 and FIG. 10) to reflect the radiation toward a predetermined direction, such as directing to a substrate (FIG. 10). The mobile radiation device can be configured using the radiation reflector, the opening of the mobile radiation device to adjust a radiation area (45) over a target (31) (FIG. 10).

The one or more carrier motion devices (13) can be selected from wheels, powered wheels, rolling wheels, tracks, rails, or a combination thereof.

The mobile radiation system can further comprise a battery power source (32) for supplying power to the mobile radiation device (1), the control unit (2), or a combination thereof.

The mobile carrier can further comprise one or more radiation supporting devices (19) (FIG. 11) to position said mobile radiation device for providing radiation to a target. In one example, one of radiation supporting devices (19) can be a retractable arm so the mobile radiation device can be attached at one end. In another example, the radiation supporting device can be coupled to a computing device or other automation devices to move the mobile radiation device in a predetermined pattern, predetermined distance to a target, a range of predetermined velocity, or a combination thereof.

The aforementioned target can comprise a target coating layer (34), such as a wet coating layer over a coated area of a substrate (31) (FIG. 11). The target coating layer (34) can be formed from one or more radiation curable target coating compositions applied over the coated area of the substrate. The target coating compositions can be solvent borne or waterborne coating compositions. The target coating layer can be cured with the radiation alone or a combination of the radiation with one or more curing processes selected from thermal curing, physical drying curing, chemical curing, or a combination thereof. Thermal curing can include curing at ambient temperatures, such as temperatures in a range of from 15° C. to 50° C.; at elevated temperatures, such as temperatures in a range of from 50° C. to 350° C.; or a combination thereof. Lacquer coating compositions can be cured by drying. The term "lacquer" or "lacquer coating composition" refers a coating composition that is capable of drying by solvent evaporation to form a durable coating on a substrate.

Chemical curing can include the reactions between crosslinkable and crosslinking functional groups. Typical crosslinkable and crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

It would be clear to one of ordinary skill in the art that certain crosslinking functional groups crosslink with certain crosslinkable functional groups. Examples of paired combinations of crosslinkable and crosslinking functional groups can include: (1) ketimine functional groups crosslinking with acetoacetoxy, epoxy, or anhydride functional groups; (2) isocyanate, thioisocyanate and melamine functional groups each crosslinking with hydroxyl, thiol, primary and secondary amine, ketimine, or aldimine functional groups; (3) epoxy functional groups crosslinking with carboxyl, primary and secondary amine, ketimine, or anhydride functional groups; (4) amine functional groups crosslinking with acetoacetoxy functional groups; (5) polyacid functional groups crosslinking with epoxy or isocyanate functional groups; and (6) anhydride functional groups generally crosslinking with epoxy and ketimine functional groups.

The irradiation curable functional groups can include ethylenically unsaturated double bonds, such as acrylic or methacrylic double bonds. Sources of UV irradiation for curing can include natural sunlight or artificial UV radiation sources. Examples of UV irradiation for curing can include, but not limited to, UV-A radiation, which falls within the wavelength range of from 320 nanometers (nm) to 400 nm; UV-B radiation, which is radiation having a wavelength falling in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm.

A coating composition having crosslinkable and crosslinking functional groups and the irradiation curable functional groups can be cured by a combination of the chemical curing and the irradiation curing. Such coating compositions can be referred to as a dual cure coating composition.

The substrate can be a vehicle or vehicle part.

This disclosure is further directed to a kit for a mobile radiation system. The kit can comprise:
(b1) a mobile radiation device (1);
(b2) a control unit (2);
(b3) one or more coupling devices (3);
(b4) a radiation blocker (4) having an adaptor opening (5) for receiving the mobile radiation device (1) in a seated position on the radiation blocker;
(b5) a mobile carrier (10) comprising a first compartment (11) for housing the radiation blocker (4), a second compartment (12) for housing the control unit, and one or more carrier motion devices (13);
wherein the mobile radiation device (1) is connectable to the control unit (2) via the one or more coupling devices (3);
the adaptor opening (5) dimensionally fits the mobile radiation device (1) to block radiations from the mobile radiation device when the mobile radiation device is received in the seated position on the radiation blocker.

The mobile radiation device of the kit can be configured to produce radiations having peak radiation wavelength in a range of from 250 nm to 450 nm and has a peak irradiation power in a range of from 1 W to 10 W.

The radiation blocker of the kit can comprise one or more UV blocking elements (6) that are capable of permitting visible radiations (21) to exit the radiation blocker while blocking UV radiations (22) from exiting the radiation blocker, the one or more UV blocking elements are transparent, translucent, fluorescent, or a combination thereof.

The mobile carrier of the kit can further comprise at least a cooling device (16) connectable to the mobile radiation device and the control unit for cooling the mobile radiation device, and the cooling device comprises a cooling sensing device (17) connectable to the cooling device to power on the cooling device when the mobile radiation device is received in the seated position.

The mobile carrier can further comprise an activity sensing device (18) connectable to the mobile radiation device and the control unit to power off the mobile radiation device when assembled and powered, if the mobile radiation device is powered and remains in the seated position for a predetermined period of time.

What is claimed is:

1. A method for curing a radiation curable coating disposed on a vehicle part, comprising:
   providing a mobile carrier comprising a mobile radiation device coupled to a control unit via one or more coupling devices and a radiation blocker having an adaptor opening for receiving the mobile radiation device when the mobile radiation device is in a seated position on the radiation blocker wherein the adaptor opening dimensionally fits the mobile radiation device to block radiation from the mobile radiation device when the mobile radiation device is in the seated position on the radiation blocker;
   removing the mobile radiation device from the seated position to a position located a predetermined irradiation distance from the vehicle part;
   powering on the mobile radiation device;
   exposing the curable coating to radiation emitted from the mobile radiation device at an irradiation power sufficient to cure at least a portion of the curable coating; and
   returning the mobile radiation device to the seated position on the radiation blocker.

2. The method of claim 1, wherein the mobile radiation device is configured to produce radiations having peak radiation wavelength in a range of from 250 nm to 450 nm and having a peak irradiation power in a range of from 0.5 W/cm2 to 10 W/cm2.

3. The method of claim 1, wherein the radiation blocker comprises one or more UV blocking elements that permit visible radiation to exit the radiation blocker while blocking UV radiation from exiting the radiation blocker, when the mobile radiation device is in the seated position.

4. The method of claim 3, wherein the one or more UV blocking elements are transparent, translucent, fluorescent, or a combination thereof.

5. The method of claim 1, wherein the mobile carrier further comprises a coupler supporting device for storing and supporting the one or more coupling devices that couple the mobile radiation device to the control unit.

6. The method of claim 1, wherein the mobile carrier further comprises one or more storage compartments.

7. The method of claim 1, wherein the mobile carrier further comprises a cooling device for cooling the mobile radiation device when the mobile radiation device is in the seated position.

8. The method of claim 7, wherein the cooling device comprises a cooling sensing device to power on the cooling device when the mobile radiation device is in the seated position.

9. The method of claim 1, wherein the mobile carrier further comprises an activity sensing device coupled to the mobile radiation device, coupled to the control unit and adapted to power off the mobile radiation device if the mobile radiation device is powered on and remains in the seated position for a predetermined period.

10. The method of claim 1, wherein the one or more carrier motion devices are selected from wheels, powered wheels, rolling wheels, tracks, rails, or a combination thereof.

11. The method of claim 1, wherein the mobile carrier further comprises one or more radiation supporting devices adapted to position the mobile radiation device for providing radiation to the curable coating of the vehicle part.

12. The method of claim 11, wherein the curable coating is a wet coating layer extending over a coated area of a substrate, the wet coating layer is formed from a radiation curable coating composition applied over the coated area of the substrate.

13. The method of claim 1, further comprising a battery power source for supplying power to the mobile radiation device, to the control unit, or to a combination thereof.

14. The method of claim 1, further comprising the step of adjusting the irradiation power by way of the control unit such that the mobile radiation device provides the irradiation power sufficient to cure at least a portion of the curable coating.

* * * * *